United States Patent
Hoymann et al.

(10) Patent No.: US 9,520,975 B2
(45) Date of Patent: Dec. 13, 2016

(54) METHODS AND DEVICES FOR TRANSMISSION OF CONTROL DATA TO A USER EQUIPMENT

(75) Inventors: Christian Hoymann, Aachen (DE); George Jöngren, Sundbyberg (SE); Lars Lindbom, Karlstad (SE); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/114,991

(22) PCT Filed: Dec. 23, 2011

(86) PCT No.: PCT/EP2011/006540
§ 371 (c)(1),
(2), (4) Date: Dec. 4, 2013

(87) PCT Pub. No.: WO2012/149952
PCT Pub. Date: Nov. 8, 2012

(65) Prior Publication Data
US 2014/0086188 A1  Mar. 27, 2014

Related U.S. Application Data

(60) Provisional application No. 61/481,926, filed on May 3, 2011.

(30) Foreign Application Priority Data

Sep. 30, 2011  (EP) .................. PCT/EP2011/004901

(51) Int. Cl.
*H04L 5/00*  (2006.01)

(52) U.S. Cl.
CPC ............. *H04L 5/0053* (2013.01); *H04L 5/001* (2013.01); *H04L 5/0094* (2013.01);
(Continued)

(58) Field of Classification Search
None
See application file for complete search history.

(56) References Cited

U.S. PATENT DOCUMENTS 8,537,862 B2 *  9/2013  Blankenship ......... H04L 5/0053
                                                    370/252
8,953,532 B2 *  2/2015  Liu ................... H04W 72/0413
                                                    370/329
(Continued)

FOREIGN PATENT DOCUMENTS

CN   101699901 A   4/2010
CN   101702828 A   5/2010
(Continued)

OTHER PUBLICATIONS

Unknown, Author. "Common PDCCH Design for Carrier Aggregation." Motorola. R1-091327. 3GPP TSG RAN1 #56bis. Mar. 23-27, 2009. Seoul, Korea.
(Continued)

*Primary Examiner* — Brandon Renner
*Assistant Examiner* — Deepa Belur
(74) *Attorney, Agent, or Firm* — Murphy, Bilak & Homiller, PLLC

(57) ABSTRACT

A method for transmission of control data to a user equipment in a mobile telecommunication system, wherein the method comprises sending control data to the user equipment in a data transmission, and performing, by the user equipment, a blind decoding of transmission elements within the data transmission in order to detect the control data in a data region in the data transmission.

17 Claims, 6 Drawing Sheets

(52) U.S. Cl.
CPC .......... *H04L 5/0023* (2013.01); *H04L 5/0035* (2013.01); *H04L 5/0048* (2013.01)

(56) References Cited

U.S. PATENT DOCUMENTS

| | | | |
|---|---|---|---|
| 9,042,336 B2* | 5/2015 | Nordstrom | H04L 5/0048 370/252 |
| 2010/0120442 A1* | 5/2010 | Zhuang | H04B 7/15507 455/450 |
| 2010/0165847 A1 | 7/2010 | Kamuf et al. | |
| 2010/0254268 A1 | 10/2010 | Kim et al. | |
| 2011/0044391 A1 | 2/2011 | Ji et al. | |
| 2011/0110296 A1* | 5/2011 | Malladi | H04W 72/042 370/328 |
| 2011/0128922 A1* | 6/2011 | Chen | H04L 5/0007 370/329 |
| 2011/0170496 A1* | 7/2011 | Fong et al. | 370/329 |
| 2011/0249633 A1* | 10/2011 | Hong et al. | 370/329 |
| 2011/0269442 A1* | 11/2011 | Han | H04W 72/082 455/418 |
| 2012/0106465 A1* | 5/2012 | Haghighat et al. | 370/329 |
| 2012/0282935 A1* | 11/2012 | Koivisto | H04L 5/0048 455/450 |
| 2013/0242904 A1* | 9/2013 | Sartori | H04L 5/0053 370/329 |

FOREIGN PATENT DOCUMENTS

| | | |
|---|---|---|
| CN | 101809898 A | 8/2010 |
| EP | 2302830 A2 | 3/2011 |
| WO | 2008083804 A2 | 7/2008 |
| WO | 2008157692 A2 | 12/2008 |
| WO | 2010070197 A1 | 6/2010 |
| WO | 2010127295 A1 | 11/2010 |

OTHER PUBLICATIONS

Unknown, Author. "PDCCH Search Space Assignment Hashing Function." Motorola. R1-081672 (R1-081289). 3GPP TSG RAN1 #52bis. Mar. 31-Apr. 4, 2008. Shenzhen, China.

Unknown, Author. "3rd Generation Partnership Project; Technical Specification Group Radio Access Network; Evolved Universal Terrestrial Radio Access (E-UTRA); Physical layer for relaying operation (Release 10)." 3GPP TS 36.216 V10.1.0. Dec. 2012.

* cited by examiner

METHODS AND DEVICES FOR TRANSMISSION OF CONTROL DATA TO A USER EQUIPMENT

TECHNICAL FIELD

The invention relates to a method for transmission of control data to a user equipment in a mobile telecommunication system.

The invention also relates to a user equipment for a mobile telecommunication system.

Beyond this, the invention relates to a control node.

Moreover, the invention relates to a mobile telecommunication system for transmission of control data.

The invention further relates to a method of operating a user equipment for a mobile telecommunication system.

Furthermore, the invention relates to a method of operating a control node for a mobile telecommunication system.

BACKGROUND

Enhanced capacity of downlink lower layer (layer 1 or L1/layer 2 or L2) control signaling is currently considered in 3GPP LTE (3$^{rd}$ Generation Partnership Project Long Term Evolution) for meeting higher control signaling loads in new deployment scenarios as well as for introducing L1/L2 control signaling that can be demodulated by using UE (user equipment) specific reference symbols. One such deployment scenario which would benefit from an enhanced L1/L2 control signaling design is heterogeneous networks with single cell identities. Another deployment scenario where enhanced L1/L2 control signaling could be of interest is for carrier aggregation with extension carriers, i.e. carriers that are not backward compatible. In release 10 of LTE, a new L1/L2 control signaling design was specified for wireless backhaul communications between a donor eNB (evolved node B) and relay node (RN). A similar L1/L2 control signaling design is considered to be introduced also on the access link, i.e. the link between an eNB and a UE, as a tool for enhancing the L1/L2 control signaling capacity and open up for demodulation of L1/L2 control signaling using UE specific reference symbols.

Heterogeneous networks are characterized by deployments with a mixture of cells of differently sized and overlapping coverage areas. One example of such network 100 is where pico cells 108 are deployed within the coverage area of a macro cell 106, as illustrated in FIG. 1 which shows different user equipment UE 102 in the cells 106, 108 associated with different base stations 104. A pico cell 108 is a small cellular base station 104 transmitting with low output power and typically covers a much smaller geographical area than a macro base station 104. The small cellular base station 104 may be referred to as a low power node, whereas a macro base station 104 represents a high power node. Other examples of low power nodes in heterogeneous networks are home base stations and relays.

Heterogeneous networks represent an alternative to densification of macro networks, and have classically been considered and motivated in cellular networks with areas of non-uniform user distributions, i.e. geographical areas with typical clustered traffic hotspots. There small cells covering the traffic hotspot can off-load the macro cell and thus improve both capacity and the overall data throughput within the coverage area of the macro cell. In emerging mobile broadband applications, there is however a continuous demand for higher bit rates and therefore it is of interest to deploy low power nodes not necessarily to cover traffic hotspots only but also at locations within the macro cell coverage where the signal-to-noise ratio prevents high data bit rates.

The traditional way of deploying cellular networks is to let different base stations 104 form separate cells 106, 108, as illustrated in FIG. 1, in which each cell 106, 108 has its own cell identity (cell-id). This means that physical layer signals transmitted from a base station 104, as well as signals received by a base station 104, are associated with a cell-id that is different from the cell identities used by neighbor base stations 104. Typically, a base station 104 in a cellular system 100 transmits its own unique signals for broadcasting of cell information and for cell synchronization. In LTE (Long Term Evolution), base stations 104 transmit cell-specific reference signals and downlink scrambling is applied to transport channels and L1/L2 control signaling where the scrambling sequence depends on the cell-id in order to randomize inter-cell interference. The use of different cell identities forms the base for reusing the same physical layer resources within a certain coverage area. For example, resources used in the macro cell 106 can also be used by the pico cells 108 in FIG. 1. The benefits of reusing resources within a geographical area are sometimes referred to as cell splitting gains. A challenge though with this type of deployment is mitigation of inter-cell interference between macro cells 106 and pico cells 108, in particular interference from the high power macro node towards the pico cells 108.

An alternative to the traditional way of deploying heterogeneous networks is to let low power nodes (related cell is denoted with reference numeral 204) within the macro coverage use the same cell-id as the macro cell 202 as illustrated in network 200 in FIG. 2. This deployment scenario is sometimes referred to as heterogeneous networks with single cell identity, in which base station nodes 104 in the network 200 are often referred to as transmission/reception points, or simply points.

Thus, UEs 102 within the geographical area defined by the coverage of the high power macro point will be served with signals from points associated with the same cell-id. Other neighbor macro points will typically use different cell identities. The concept of points is closely related with techniques for coordinated multipoint (CoMP) transmissions and receptions. In this context, a point corresponds to a set of antennas covering essentially the same geographical area in a similar manner. Antennas correspond to different points when they are sufficiently geographically separated and/or having antenna diagrams pointing in sufficiently different directions. Techniques for CoMP entail introducing dependencies in the scheduling or transmission/reception among different points, in contrast to conventional cellular systems where a point from a scheduling point of view is operated more or less independently from the other points.

Characteristics for heterogeneous networks 200 with single cell id are the need for tight coordination of the transmissions across points within the coverage defined by the macro point and that received signals at the UE 102 appear coming from a single cell 202. A fundamental difference from deployments with multiple cell identities, as for instance the one illustrated in FIG. 1, is the avoidance of inter-cell interference across points within the coverage defined by the high power macro point. However, in contrast to multiple cell identity approach, the single cell identity approach requires both fast connections (such as fiber) and tight transmission coordination between the macro point and the pico points. Which physical signals and channels that are sent from a certain point, or points, can be deployment specific but broadcast and control channels may all be transmitted from the high power point only while data can be transmitted to a UE 102 also from low power points by using shared data transmissions relying on UE specific reference symbols. One example would be a base station 104 serving one or more sectors on a macro level as well as having fast fiber connections to remote radio units (RRUs) playing the role of the other points sharing the same cell-id. Those RRUs could represent low power points with one or more antennas each. Another example is when all the points have a similar power class with no single point having more significance in than the others. The base station 104 would then handle the signals from all RRUs in a similar manner.

LTE uses Orthogonal Frequency Division Multiplexing (OFDM) in the downlink and Discrete Fourier Transform spread OFDM (DFT-spread OFDM) in the uplink. In OFDM transmissions, a set of modulated symbols is transmitted over narrowband and orthogonal subcarriers, where the number of subcarriers defines the transmission bandwidth of the OFDM signal. In DFT-spread OFDM, the set of modulated symbols is first pre-coded before generating the OFDM signal, where the pre-coding aims to provide power characteristics of the OFDM signal suitable for transmit power limited terminals.

A basic LTE physical resource can thus be seen as a time-frequency grid 300 as illustrated in FIG. 3, where each resource element 302 corresponds to one subcarrier during one OFDM symbol interval. In LTE, frequency spacing between subcarriers is 15 kHz. Time domain is plotted as reference numeral 304, whereas frequency domain is plotted as reference numeral 306.

In the time domain 304, LTE downlink transmissions are organized into radio frames of 10 ms, each radio frame comprising ten equally-sized subframes of 1 ms. A subframe is divided into two slots, each of 0.5 ms time duration. Each slot comprises of either 6 or 7 OFDM symbols depending on the selected cyclic prefix length. LTE supports two cyclic prefix lengths, commonly referred to as the normal and extended cyclic prefix, respectively. The cyclic prefix, inserted in the beginning of the OFDM symbol interval, aims to mitigate inter-symbol interference.

The resource allocation of data in LTE is described in terms of resource blocks, where a resource block corresponds to one slot in the time domain 304 and 12 contiguous subcarriers in the frequency domain 306. Two in time consecutive resource blocks represent a resource block pair and corresponds to the time interval upon which scheduling operates. A user can be assigned data in one or multiple resource block pairs. Transmissions in LTE are dynamically scheduled in each subframe where the base station 104 transmits assignments and/or grants to certain user equipments 102 via the Physical Downlink Control Channel (PDCCH). The PDCCH is transmitted in the first OFDM symbol(s) in each subframe and spans over the whole system bandwidth. A UE 102 that has decoded downlink control information, carried by a PDCCH, knows which resource blocks in the subframe contain data aimed for the user equipment 102. In LTE, data is carried by the physical downlink shared channel (PDSCH).

FIG. 4 illustrates an example for LTE data transmission 400 in the form of a DL subframe 402 having a control region 404 and a data region 406. Individual blocks include cell specific reference symbols 408, control blocks 410 and data blocks 412.

Demodulation of sent data requires estimation of the radio channel which is done by using transmitted reference symbols 408, i.e. symbols known by the receiver. In LTE, cell specific reference symbols 408 are transmitted in all downlink subframes and in addition to assist downlink channel estimation they are also used for mobility measurements performed by the user equipments 102. LTE supports also UE specific reference symbols 408 aimed only for assisting channel estimation for demodulation purposes. The UE specific reference symbols 408 are transmitted in the data region 406 such that they do not collide with the cell specific reference symbols 408.

The length of the control region 404, which can vary on subframe basis, is conveyed in the Physical Control Format Indicator CHannel (PCFICH). The PCFICH is transmitted within control region 404, at locations known by terminals. After a terminal has decoded the PCFICH, it thus knows the size of the control region 404 and in which OFDM symbol the data transmission starts. Also transmitted in the control region 404 is the Physical Hybrid-ARQ Indicator Channel. This channel carries ACK/NACK responses to a UE 102 to inform if the uplink data transmission in a previous subframe was successfully decoded by the base station 104 or not.

Downlink assignments and uplink grants are conveyed in Downlink Control Information (DCI) messages carried by PDCCHs. Multiple DCI formats of different payloads are supported in LTE and reflect the different transmission modes that UEs 102 can be configured to operate within. Encoded into the DCI message is a specific radio network temporary identity (RNTI), used to either address a single user or a group of users, or all users connected to the cell. Thus, LTE supports multiple types of RNTIs considered for different purposes such as unicast transmissions and transmissions of system information, paging and random access responses. In the case of unicast data transmissions, a UE specific RNTI is encoded into the DCI message. UEs 102 monitor PDCCH transmissions and check if it's unique RNTI match the received DCI message. If it does, it demodulates the message and receive/transmit data in accordance with the control message. Which DCI format that is used in the transmission is unknown to the UE 102 and it therefore needs to blindly decode PDCCHs under different DCI format hypotheses.

In order to facilitate link adaptation on PDCCH transmissions, as a request to meet different radio reception conditions, LTE has introduced a certain mapping structure of PDCCH to resource elements in which 36 resource elements are grouped into Control Channel Elements (CCEs). The PDCCH can then be mapped to 1, 2, 4 or 8 CCEs depending on the DCI payload and the desired coding rate of the control information. Thus, the number of resource elements used for a PDCCH transmission is 36n, where n=1, 2, 4, 8. Depending on the coding rate the robustness of the signals can be modified in view of the transmission quality.

Typically, multiple PDCCHs are transmitted within the control region as a request of addressing multiple users in the same subframe. Exactly where in the control region the PDCCH is transmitted to a certain user is not known in advance, implying that the UE 102 needs to search blindly for the locations of the PDCCHs. However, in order to reduce the search burden of blind detection attempts of possible PDCCH locations UE specific search spaces and common search spaces can be defined.

The UE specific search space refers to limit the possible set of PDCCH resources that can be allocated for a particular UE 102 to address unicast transmissions. Each connected UE 102 in the cell is configured with its own search spaces. As multiple users can be scheduled within the same subframe, the UE specific search spaces associated to the connected users within the cell should not fully overlap. The common search spaces are used to send DCI messages intended to several or all users at the same time. Thus, a UE 102 is supposed to monitor its own configured UE specific search spaces for unicast transmissions as well as the common search spaces for primarily receiving for instance system information and paging, i.e. information that address all, or a group, of connected users. It can be noted that the common search spaces can also be used for unicast transmissions.

In connected mode, a UE 102 will be configured by higher layer signaling with two common search spaces and four UE specific search spaces. The common search spaces relate to aggregation levels of 4 and 8 CCEs, respectively, whereas the UE specific search spaces relate to one for each CCE aggregation level, i.e. 1, 2, 4 and 8 CCEs.

Heterogeneous networks with single cell-id prevent cell splitting of PDCCH resources within the coverage of the macro point. This implies that the PDCCH capacity is the same irrespective if low power points are introduced or not. As introducing heterogeneous networks are motivated to improve the mobile broadband user experience in cellular networks and at the same time meet a dramatically increasing number of mobile broadband users, there is an emerging need to enhance the PDCCH capacity. Furthermore, the requirement of transmitting cell specific reference symbols in all subframes prevents efficient solutions for saving energy in the base stations and therefore it is of interest to reduce the dependency of cell specific reference symbols in future LTE releases.

Relaying was introduced in LTE Rel. 10, see 3GPP TS 36.216 v10.1.0, "Physical layer for relaying operation". Since relay nodes (RNs) might not be able to receive the regular control channel (PDCCH) from its donor eNB (DeNB) a new control channel, the R-PDCCH, (Relay PDCCH) was introduced. FIG. 5 illustrates a scheme 500 indicating an example of R-PDCCH transmission.

The R-PDCCH 502 is not transmitted in the L1/L2 control region 504, which is composed of the first (up to 4) OFDM symbols per subframe and which spans the entire frequency domain 306. Instead the R-PDCCH 502 is transmitted in the regular data region 506 of a subframe as illustrated in FIG. 5. In time domain 304, the R-PDCCH 502 starts at the 4th (in first slot 508 of a subframe) or first OFDM symbol of a slot (in second slot 510 of a subframe) and ends at the end of the slot. In frequency domain 306 it is transmitted on one or more resource blocks. Downlink assignments 512 are transmitted on an R-PDCCH 502 in the first slot 508 and uplink grants 514 are transmitted on an R-PDCCH 502 in the second slot 510. The R-PDCCH 502 can be transmitted on antenna ports with UE-specific reference symbols.

Similar to PDCCH transmissions, R-PDCCHs 502 can be transmitted by applying the concept of a search space, i.e. configuring candidate locations in the time-frequency grid where the receiver can expect an R-PDCCH transmission. For the R-PDCCH design two search spaces exist. The search space in the first slot 508 of a subframe contains candidate locations for downlink assignments 512 and the search space in the second slot 510 of a subframe contains candidate locations for uplink grants 514.

The R-PDCCH 502, or a similar control channel based on UE-specific reference signals, may be used to transmit control information to regular UEs 102 in future releases of LTE.

However, UEs 102 capable of receiving and detecting PDCCH and further control transmissions need to monitor search spaces associated with both ways of sending DCI messages. This implies that the number of blind detections needed by a UE 102 will increase significantly in comparisons with monitoring PDCCH only. This would significantly increase the requirements on processing capability of the receiver as well as the power consumption.

SUMMARY

It is an object of the invention to limit the search complexity for blindly monitoring control transmissions.

In order to achieve the object defined above, a method for transmission of control data to a user equipment in a mobile telecommunication system, a user equipment for a mobile telecommunication system, a control node, a mobile telecommunication system for transmission of control data, a method of operating a user equipment for a mobile telecommunication system, and a method of operating a control node for a mobile telecommunication system according to the independent claims are provided.

According to an embodiment of the invention, a method for transmission of control data to a user equipment in a mobile telecommunication system is provided. The method comprises sending control data to the user equipment in a data transmission, and performing, by the user equipment, a blind decoding of transmission elements within the data transmission in order to detect the control data in the data transmission.

According to another embodiment of the invention, a user equipment for a mobile telecommunication system is provided, wherein control data is to be transmitted to the user equipment in the mobile telecommunication system. The user equipment comprises a receiver adapted to receive control data in a data transmission, and a decoder for performing a blind decoding of transmission elements within the data transmission in order to detect the control data in the data transmission.

According to another embodiment of the invention, a control node for a mobile telecommunication system is provided. The control node comprises a transmitter for sending control data to a user equipment in a data transmission, and an encoder for encoding of transmission elements within the data transmission in order to enable the user equipment to detect the control data in a data region in the data transmission by a blind decoding of the transmission elements.

According to yet another embodiment of the invention, a mobile telecommunication system for transmission of control data is provided. The mobile telecommunication system comprises a user equipment having the above mentioned features, and a control node having the above mentioned features, wherein the control data is to be transmitted from the control node to the user equipment.

According to still another embodiment of the invention, a method of operating a user equipment for a mobile telecommunication system is provided. The method comprises receiving control data in a data transmission. The method further comprises performing a blind decoding of transmission elements in a data region within the data transmission in order to detect the control data in the data transmission.

According to yet another embodiment of the invention, a method of operating a control node for a mobile telecommunication system is provided. The method comprises sending control data to a user equipment in a data transmission. The method further comprises encoding transmission elements within the data transmission in order to enable the user equipment to detect the control data in a data region in the data transmission by a blind decoding of the transmission elements.

An embodiment of the invention may be embodied in software, for instance on a data carrier, adapted to execute any of the above methods when loaded into a user equipment or a control node.

Particularly, a program element (for instance a software routine, in source code or in executable code) is provided, which, when being executed by a processor (such as a microprocessor or a CPU), is adapted to control or carry out any of the methods having the above mentioned features.

These described embodiments have the advantages that the processing effort for UEs monitoring the UE specific search space will be reduced significantly. This means that terminals need less processing power and thus can save battery consumptions.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

DETAILED DESCRIPTION

Figure 1:
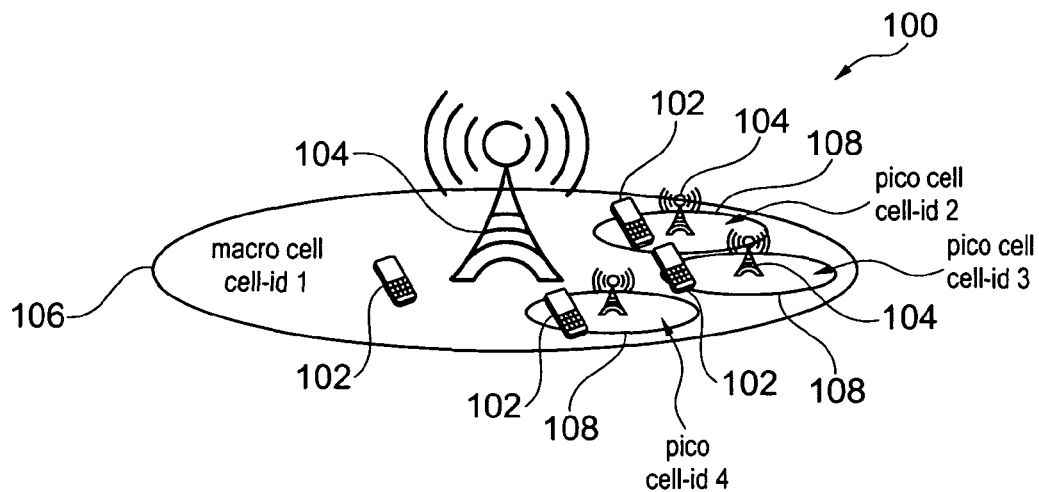
FIG. 1 illustrates a heterogeneous network with macro and pico cell deployments.
Figure 2:
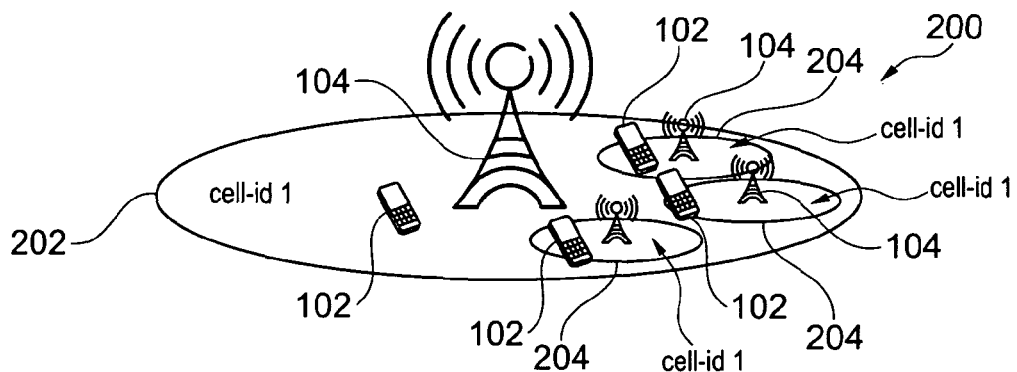
FIG. 2 illustrates a heterogeneous networks with single cell-id.
Figure 3:
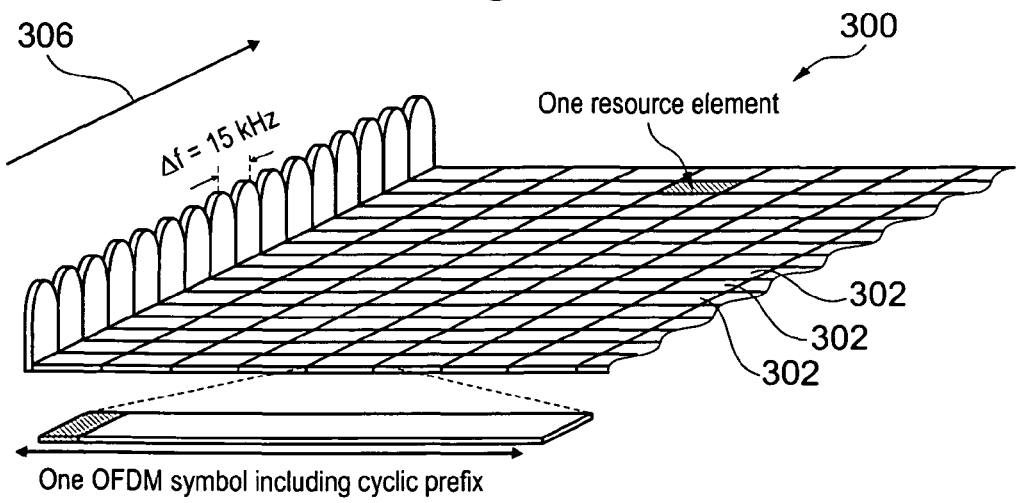
FIG. 3 illustrates an LTE downlink physical resource.
Figure 4:
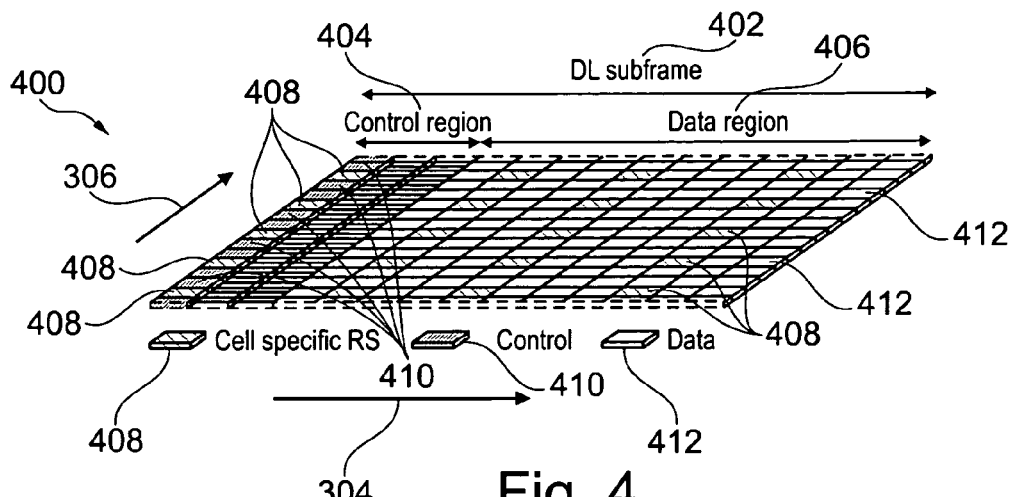
FIG. 4 illustrates mapping of LTE physical control channels, data channels and cell specific reference signals within a downlink subframe.
Figure 5:
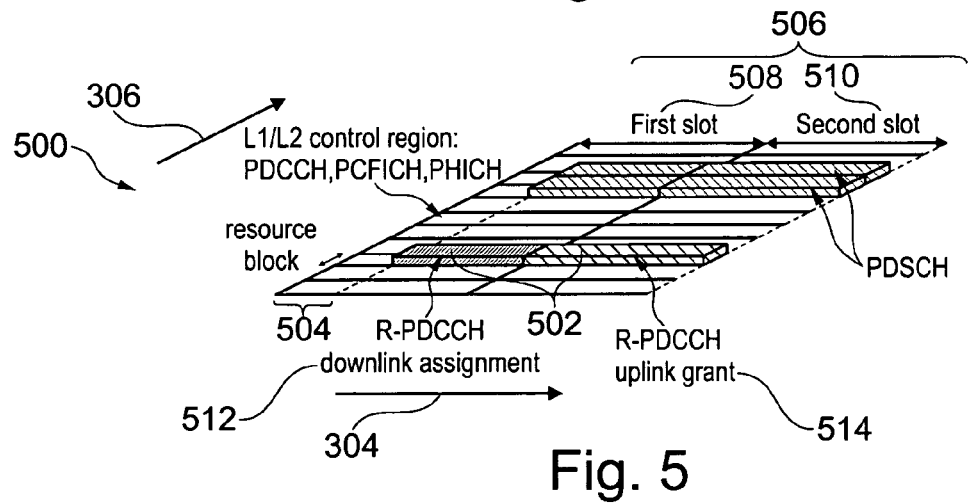
FIG. 5 illustrates an example of R-PDCCH transmission.

In the context of this application, the term "data transmission" may particularly denote a transmission of user data and/or control data. Such a data transmission may be in the form of a subframe.

In the context of this application, the term "data region" may particularly denote a portion or the entire data transmission which carries user data, i.e. data for forwarding to higher layers of the data transmission above layer 1 and/or 2. The user data comprises in particular a content to be transmitted from a base station to a user equipment, or vice versa. An example for such user data is audio and/or video data, multimedia data or any other telecommunication related data, more generally data relating to the user plane. The data region may be the part of the data transmission used for user data transmission and may have embedded therein control data so that blocks of user data may be located around or surrounding blocks of control data. In an embodiment, the data region may be distinct from the control region, particularly may be arranged downstream of the control region in terms of data flow.

In the context of this application, the term "control region" may particularly denote an, in some embodiments optional, portion of a data transmission, for instance located at an initial portion or header portion of a data transmission, which carries, particularly exclusively, control data.

In the context of this application, the term "control data" may particularly denote data being used for controlling the transmission in layer 1 and/or 2 of the user equipment receiving such control data. This can be for example a physical control channel or control data for layer 2 retransmission control (Hybrid ARQ). Hence, the control data may be sent in the form of instructions from the base station to the user equipment. Based on the control data, an operation mode of layer 1 and/or 2 of the user equipment may be adjusted.

In the context of this application, the term "transmission elements" may particularly denote blocks of the data transmission via which control and/or user data are transmitted. Such transmission elements may be defined by a portion in the time domain and a portion in the frequency domain.

In the context of this application, the term "blind decoding" may particularly denote a method of decoding at least a part of a data transmission by user equipment, wherein the user equipment does not possess the unambiguous information that the desired control data is really present in the decoded portion of the data transmission. However, in an exemplary embodiment the user equipment may possess information indicative of candidate transmission elements in which there is a high likelihood of the presence of control data. It is for instance also possible that the user equipment needs to blindly decode transmission elements (such as transmission elements related to PDCCH) under certain format hypotheses.

Next, further exemplary embodiments of the method for transmission of control data to a user equipment in a mobile telecommunication system will be explained. However, these embodiments also apply to the user equipment for the mobile telecommunication system, the control node, the mobile telecommunication system for transmission of control data, the method of operating the user equipment for the mobile telecommunication system, and the method of operating the control node for the mobile telecommunication system.

In an embodiment, the method comprises configuring, e.g. by a control node such as a base station, a position of a plurality of transmission elements which are potential bearers of the control data, and sending, e.g. by a control node such as a base station, control information to the user equipment in order to select transmission elements among the configured transmission elements which the user equipment monitors for the blind decoding. In such an embodiment, the control node may indicate to the user equipment specific transmission elements which are candidates for carrying the control data to be extracted by the user equipment from a data transmission. Therefore, the probability is increased that the blind decoding is successful, thereby reducing complexity of the user equipment. The control information selects a subset of transmission elements where control data could be located in a data transmission among the configured transmission elements. The configuring may be performed in layer 3, whereas the sending may be performed in layers 1 and 2.

Search spaces may denote sections in the data transmission bearing the control data. In this application control data regions are correspondingly also denoted as search spaces. In an embodiment, the data transmission has a first control data region and has a second control data region. The second control data region may be located in the data region of the data transmission. The user equipment may be capable of detecting the control data both in the first control data region and in the second control data region. Hence, it is possible that different, i.e. a plurality of, control data regions or search spaces are present in which control data may be provided. At least a part of such control data may be arranged in the data region of the data transmission allowing to use these resources also for the transmission of control data.

In an embodiment, the first control data region relates to a Physical Downlink Control Channel (PDCCH). In an embodiment, the second control data region relates to an enhanced Physical Downlink Control Channel (ePDCCH).

In another embodiment, the first control data region is located in the data region of the data transmission. Thus, control space may be increased, and it may be even possible to omit a separate control region completely to thereby allow a more flexible allocation of user data and the control data transmission. Omitting the control region, i.e. not using PDCCH, is possible particularly for non-legacy users, i.e. users capable of receiving E-PDCCH.

In an alternative embodiment, the first control data region is located in a region in the data transmission distinct from the data region, e.g. preceding the data region. Such a region distinct from the data region may be a dedicated control region used for transmitting exclusively control information. When using this region for the transmission of control data, the system may be rendered compatible with legacy equipment not being capable of determining control data in the data region.

In an embodiment, the first control data region comprises common control data for monitoring by a group of user equipments and may correspondingly also be denoted as a common search space. The second control data region may comprise user equipment specific control data for said user equipment and may correspondingly also be denoted as a user equipment specific search space. Thus, common search spaces may be located in the control region, whereas the user equipment specific control data may be located in the data region. This simplifies the handling of the control data because control information which is potentially directed to a plurality of user equipments is located in the control region so that it can both be decoded by user equipment adapted to the present method and legacy user equipment. This can avoid reconfigurations if legacy user equipment, e.g., enters or leaves a cell.

In an embodiment, the data transmission is configured without a control region, i.e. does not comprise a control region, in the data transmission preceding the data region. In such an embodiment, the entire data transmission such as a subframe may consist of a data region only, wherein any free slots within the data region can be used for transmitting necessary control data. This is a very efficient way of using resources. In such an embodiment, the data transmission is configured so that only advanced user equipment, not legacy user equipment, is supported, advanced user equipment being capable of extracting control data from the data region.

In an embodiment, the data transmission comprises a control region in the data transmission preceding the data region, wherein the control region is free of control data specifically associated with the user equipment, i.e. does not contain search spaces exclusively for the user equipment under consideration. The control region may still comprise other search spaces for different user equipment or common search spaces addressed to both the user equipment under consideration and one or more further user equipment, e.g. to any user equipment receiving the data transmission. In this case, a double provision of control data in the control region for legacy user equipment and in the data region for advanced user equipment (being compatible with PDCCH) can be avoided. In other words, for advanced user equipment control data may be provided in the data region only.

In an embodiment, the method further comprises determining whether the user equipment is capable of deriving control data from the data region of the data transmission, and upon determining that the user equipment is capable of deriving control data from the data region, configuring search spaces for said user equipment in the data region. Particularly, the method may comprise determining whether the user equipment is a legacy user equipment capable of deriving control data from a control region of the data transmission only, or whether the user equipment is advanced user equipment capable of deriving control data also from the data region of the data transmission. Upon determining that the user equipment is a legacy user equipment, the user equipment is operated in a first configuration with search spaces in the control region of the data transmission preceding the data region. Upon determining that the user equipment is an advanced user equipment, the user equipment is operated in a second configuration with search spaces in the data region. Thus, one or more communication messages may be exchanged between a control node and the user equipment so that the control node can determine type or identity of the user equipment. Then, depending on the determined capability or functionality of the user equipment, the control node may adjust the position of control data in the data transmission so that the user equipment with the defined functionality is able to find and interpret the control data.

In an embodiment, the data transmission comprises a first section in the time-frequency domain and comprises a distinct second section in the time-frequency domain, wherein the first section comprises a first control region and a first data region, and wherein the second section comprises a second data region and optionally a second control region, wherein at least one of the first data region and the second data region comprises at least a part of the control data. The first section and the second section may relate to a secondary component carrier and to a primary component carrier.

Next, further exemplary embodiments of the user equipment for the mobile telecommunication system will be explained. However, these embodiments also apply to the method for transmission of control data to a user equipment in a mobile telecommunication system, the control node, the mobile telecommunication system for transmission of control data, the method of operating the user equipment for the mobile telecommunication system, and the method of operating the control node for the mobile telecommunication system.

In an embodiment, a position of a plurality of transmission elements is configured, which transmission elements are potential bearers of the control data. The user equipment may be adapted to receive control information in order to select transmission elements among the configured transmission elements which the user equipment monitors for the blind decoding. The user equipment comprises a controller for specifying selected transmission elements among the configured transmission elements according to the control information and for controlling the decoder so that blind decoding is restricted to the selected transmission elements. Hence, the user equipment may be configured to carry out the above mentioned method in terms of managing transmission elements being potential bearers of control data.

In an embodiment, the user equipment is capable of receiving and detecting Physical Downlink Control Channel messages (PDCCH). However, the transmission elements may be of different type as well.

In an embodiment, the user equipment is adapted for monitoring control data regions or search spaces, associated with two options of sending Downlink Control Information (DCI) messages based on the detected control data. Common search spaces (CSS) may be provided in common for a group of user equipment. The term denotes a search space which is monitored by all the user equipment in the group. The group may comprise all user equipment receiving the transmission, e.g. all UE in a cell, or a subgroup of them, i.e. typically a plurality of user equipments but optionally also a single user equipment, e.g. if it is the only UE in a cell. Common search spaces may also be used for unicast transmissions to any user equipment in the group monitoring the common search space. User equipment specific search spaces (USS) may be provided individually for each individual user equipment.

In an embodiment, the user equipment is configured with a control data region or search space of a first type, the first type particularly relating to common control data for different or a plurality of user equipments. In an embodiment, the search spaces of the first type are associated with the Physical Downlink Control Channel. The first type of search spaces can therefore be a common search space which is provided unspecifically with regard to the individual user equipments.

In an embodiment, the user equipment is configured with a control data region or search space of a second type, the second type particularly relating to user equipment specific search spaces. In an embodiment, the search spaces of the second type are associated with an enhanced Physical Downlink Control Channel. The second type may be user equipment dependent specific search spaces which individually relates to a certain user equipment. Hence, the position of such corresponding transmission elements may depend on an identity of a user equipment.

In an embodiment, the control data regions or search spaces of the second type are divided into two sets of user equipment specific search spaces, wherein one set is associated with reception of downlink assignments and another set is associated with reception of uplink grants. In the context of this embodiment, the term "downlink" may relate to a data transmission direction from a base station to the user equipment. In the context of this embodiment, the term "uplink" may particularly denote to a data transmission direction from a user equipment to a base station.

In an embodiment, the user equipment is instructed to only monitor a subset of sets of control data regions or search spaces of a specific type, i.e. the same type, in accordance with an indication to the user equipment by a network, particularly by the mobile telecommunication system. By only monitoring a subset of the search spaces, the processing capability for detecting control data in the user equipment may be significantly reduced.

Next, further exemplary embodiments of the control node will be explained. However, these embodiments also apply to the method for transmission of control data to a user equipment in a mobile telecommunication system, the user equipment for the mobile telecommunication system, the mobile telecommunication system for transmission of control data, the method of operating the user equipment for the mobile telecommunication system, and the method of operating the control node for the mobile telecommunication system.

In an embodiment, a position of a plurality of transmission elements is configured, which transmission elements are potential bearers of the control data, wherein control information is sent to the user equipment in order to select transmission elements among the configured transmission elements which the user equipment monitors for the blind decoding. The control node may comprise a controller for specifying selected transmission elements among the configured transmission elements and for indicating the selected transmission elements to the user equipment. Therefore, even the controller may be configured for performing the transmission element classification in which specific transmission elements are configured for blind decoding.

In an embodiment, the control node is configured as a base station for a telecommunication system. Other opportunities are possible as well. For instance, the control node can also be a control node operating in a wired manner within a wired communication network.

Next, a further exemplary embodiment of the mobile telecommunication system for transmission of control data will be explained. However, this embodiment also applies to the method for transmission of control data to a user equipment in a mobile telecommunication system, the user equipment for the mobile telecommunication system, the control node, the method of operating the user equipment for the mobile telecommunication system, and the method of operating the control node for the mobile telecommunication system.

In an embodiment, the mobile telecommunication system is adapted as a Long Term Evolution (LTE) system. 3GPP Long Term Evolution (LTE) is a standard for wireless communication of high-speed data. It is based upon GSM/EDGE and UMTS/HSPA network technologies. The standard is maintained as a project of the 3rd Generation Partnership Project (3GPP).

Embodiments of the invention provide methods for controlling search space monitoring in deployments with enhanced physical downlink control channels.

In order to limit the search complexity for blindly monitoring control, for instance DCI, messages intended to the UE, a mechanism for restricting the search space monitoring is specified.

In the terms of LTE, an exemplary embodiment provides mechanisms on how a UE shall monitor the UE specific search space and the common search space when DCI messages can be sent in enhanced PDCCH (E-PDCCH). The term E-PDCCH may relate to any further developments of PDCCH as any future control channel design for the UE. In the remainder of the description the term E-PDCCH will be used as a synonym for an enhanced PDCCH design that might resemble in format to R-PDCCH design as well as to any future control channel design based on UE specific reference signals.

In general terms, an exemplary embodiment provides a method for transmission of control data to a user equipment in a mobile telecommunication system, wherein the control data is sent to the user equipment in a data transmission and wherein the user equipment performs a blind decoding of transmission elements within the data transmission in order to detect the control data in the data transmission.

In the method, the position of a plurality of transmission elements may be configured which are potential bearers of the control data. Control information may be sent to the user equipment in order to select transmission elements among the configured transmission elements which the user equipment monitors for the blind decoding.

In an embodiment, a user equipment of the telecommunication system can be adapted to the method. In this case the user equipment may comprise a receiver for the data transmission, a decoder for the control signaling and a controller for specifying selected transmission elements among the configured transmission elements and for controlling the decoder so that the blind decoding is restricted to the selected transmission elements.

In a further embodiment, a control node, for instance in a base station of the telecommunication system, can be adapted to the method. In this case the control node may comprise a transmitter for the data transmission, an encoder for the control signaling and a controller for specifying selected transmission elements among the configured transmission elements and for indicating the selected transmission elements to a user equipment.

In the following, more detailed examples of embodiments are described in the terms of an LTE system. However, it is to be understood that this description and all embodiments can be generalized to other systems in line with the general features as described above. Some examples for such generalizations are indicated in the following text. For example, a PDCCH can be considered in general terms as a first control data region in the data transmission, and an E-PDCCH as a second control data region in the data transmission. The second control data region may be located in a data region of the data transmission.

In connected mode a UE capable of detecting both PDCCH and E-PDCCH may be configured, for instance by higher layer signaling, with common search spaces and UE specific search spaces associated with detection of PDCCH, or E-PDCCH, or combinations of them. By directly introducing E-PDCCH and adopting the concepts of search spaces would imply that a UE would need to monitor more than two configured set of common search spaces and more than four configured set of UE specific search spaces.

A UE that has been configured with search spaces associated with PDCCH can be re-configured with search spaces associated with E-PDCCH. Search spaces of a certain type (for instance common or UE-specific) forms a set of search spaces of same type. A network may indicate to a UE to only monitor a subset of the sets configured for E-PDCCH.

In general terms, reconfigurations allow that a UE when first accessing a cell can be configured in a first configuration with search spaces in the control region of a data transmission. In this way communications with legacy equipment can be ensured. If both the user equipment and the control node are adapted to the present method a further configuration allows also for use of a second control data region.

In a further option, the UE specific search spaces associated with E-PDCCH can be divided into two sets of UE specific search spaces, one set associated with reception of downlink assignments and another set associated with reception of uplink grants.

The illustration in the drawing is schematical. In different drawings, similar or identical elements are provided with the same reference signs.

Figure 6:
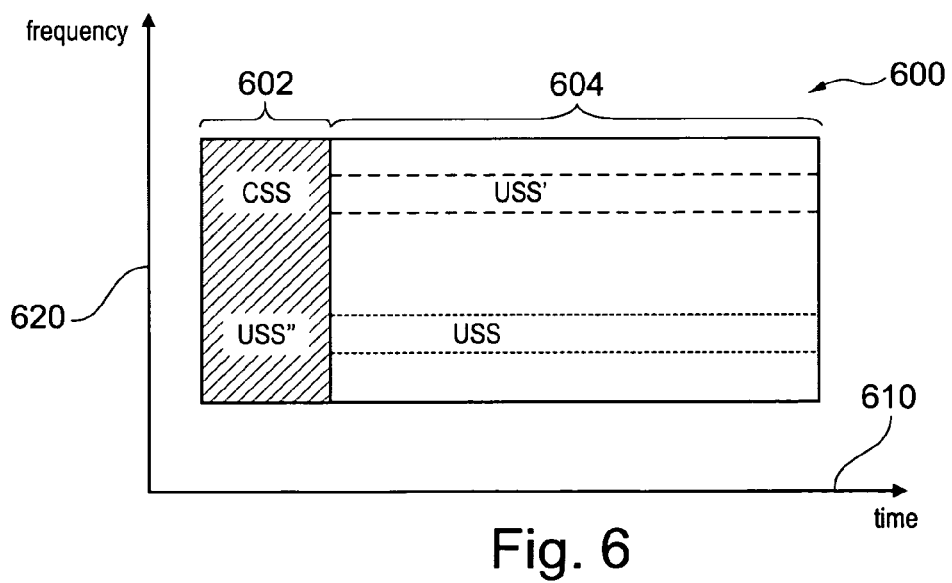
FIG. 6 illustrates a data transmission having a control region and a data region and being constituted in accordance with an exemplary embodiment of the invention.

In the following three examples of embodiments are described in more detail referring to FIG. 6 to FIG. 8:

In a first embodiment as shown in FIG. 6, a UE (for instance the one shown in FIG. 10) is configured with one common search space set (CSS) associated with PDCCH transmissions and one UE specific search space set (USS) associated with E-PDCCH transmissions. A UE that has been instructed by the network (for instance the one shown in FIG. 9) to monitor the UE specific search space(s) associated with E-PDCCH does not need to (shall not) monitor the UE specific search spaces associated with PDCCH. The UE shall, when configured to monitor E-PDCCH, only monitor the common search space set in the control region associated with PDCCH transmissions.

An example of this embodiment is shown in FIG. 6 which depicts a downlink subframe 600 in time and frequency dimension, wherein time is plotted along an abscissa 610 and frequency is plotted along an ordinate 620. The downlink subframe 600 (which may generally be denoted as a data transmission also) starts with a control region 602. The control region 602 comprises also the common search space set CSS for any user equipment. In addition, the subframe 600 comprises also an E-PDCCH in a data region 604 which comprises the UE specific first set USS for a first UE (indicated by dotted lines). A second UE has another position for the associated USS' in the data region 604 (indicated by broken lines). An advantage of this embodiment is that it is compatible with legacy user equipment which may receive a USS" in the control region 602. According to particular embodiments, this control region 602 is not monitored by UE adapted to an embodiment of the invention for the associated USS, USS' as described above.

Figure 7:
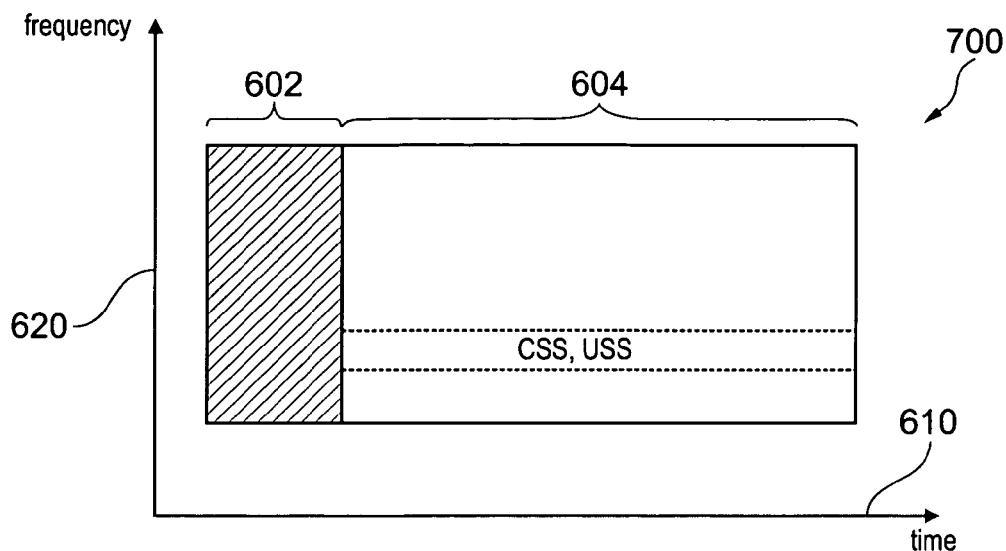
FIG. 7 illustrates a data transmission having a control region and a data region and being constituted in accordance with another exemplary embodiment of the invention.

In a second embodiment as shown in FIG. 7, a UE (for instance the one shown in FIG. 10) is configured by higher layer signaling with one set of common search spaces CSS associated with E-PDCCH and with one set of UE specific search spaces USS also associated with E-PDCCH. Both CSS and USS are assigned to the data region 604, whereas control region 602 is free of CSS and USS.

It is also possible that a corresponding subframe 700 does not comprise a control region 602, for instance if the carrier is an extension carrier in carrier aggregation and only the primary carrier comprises a control region 602.

Figure 8:
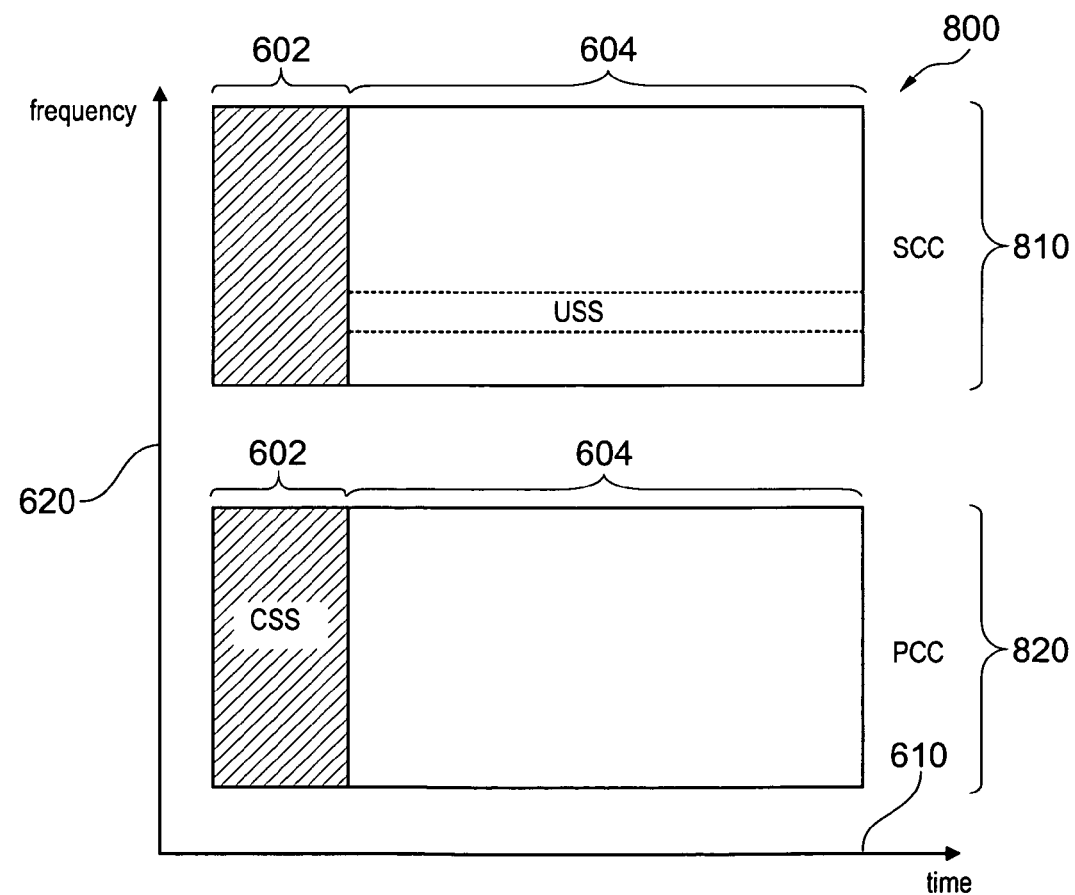
FIG. 8 illustrates a data transmission having a control region and a data region and being constituted in accordance with still another exemplary embodiment of the invention.

In a third embodiment and corresponding subframe 800 as shown in FIG. 8, the UE (for instance the one shown in FIG. 10) is configured with one common search space set CSS associated with PDCCH transmissions on a primary component carrier (PCC or Pcell, see reference numeral 820) and one UE specific search space set USS associated with E-PDCCH transmissions on a secondary component carrier (SCC or Scell, see reference numeral 810). A UE that has been instructed by the network (for instance the one shown in FIG. 10) to monitor the UE specific search space(s) associated with E-PDCCH on the SCC does neither need to (shall not) monitor the UE specific search spaces USS associated with PDCCH nor the common search space set CSS associated with PDCCH on the SCC. In particular if legacy user equipment is not adapted to carrier aggregation backward compatibility of user equipment is not required in the scenarios of FIG. 7 or FIG. 8 if the legacy user equipment cannot handle the respective carriers.

In the embodiment of FIG. 8, the data transmission corresponding to the subframe 800 comprises an SCC or first section 810 in the time-frequency domain and comprises a separate PCC or second section 820 in the time-frequency domain, wherein the first section 810 comprises a first control region 602 and a first data region 604 and the second section 820 comprises a second control region 602 and a second data region 604. The first control region 602 of the first section 810 is free of control data. The first data region 604 of the first section 810 comprises control data assigned to USS. The second control region 602 of the second section 820 comprises control data CSS. The second data region 604 of the second section 820 is free of control data.

Embodiments of the invention, particularly the embodiments of FIG. 6 to FIG. 8, can be implemented in base stations (for instance the one shown in FIG. 11) and user equipment (for instance the one shown in FIG. 10), for example in eNBs and terminals compliant with LTE and LTE-Advanced standards.

Figure 9:
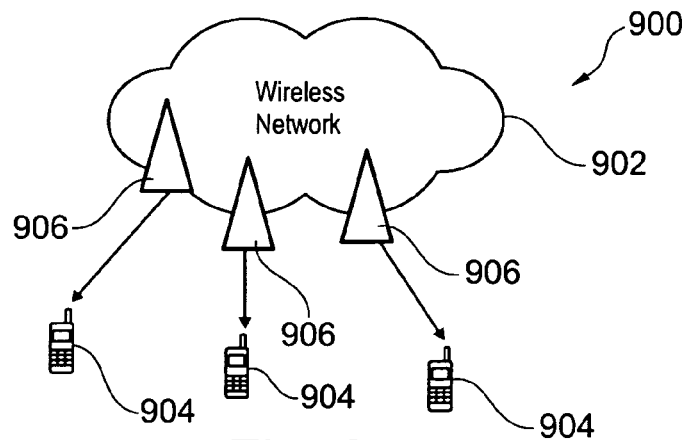
FIG. 9 illustrates a mobile communication system according to an exemplary embodiment of the invention.

Although the described solutions may be implemented in any appropriate type of telecommunication system supporting any suitable communication standards and using any suitable components, particular embodiments of the described solutions may be implemented in an LTE network, such as that illustrated in FIG. 9.

As shown in FIG. 9, the example network 902, which may form part of a mobile communication system 900, may include one or more instances of user equipment 904 (UEs) and one or more base stations 906 capable of communicating with these UEs 904, along with any additional elements suitable to support communication between UEs 904 or between a UE 904 and another communication device (such as a landline telephone or a data server). Although the illustrated UEs 904 may represent communication devices that include any suitable combination of hardware and/or software, these UEs 904 may, in particular embodiments, represent devices such as the example UE 904 illustrated in greater detail by FIG. 10.

Figure 11:
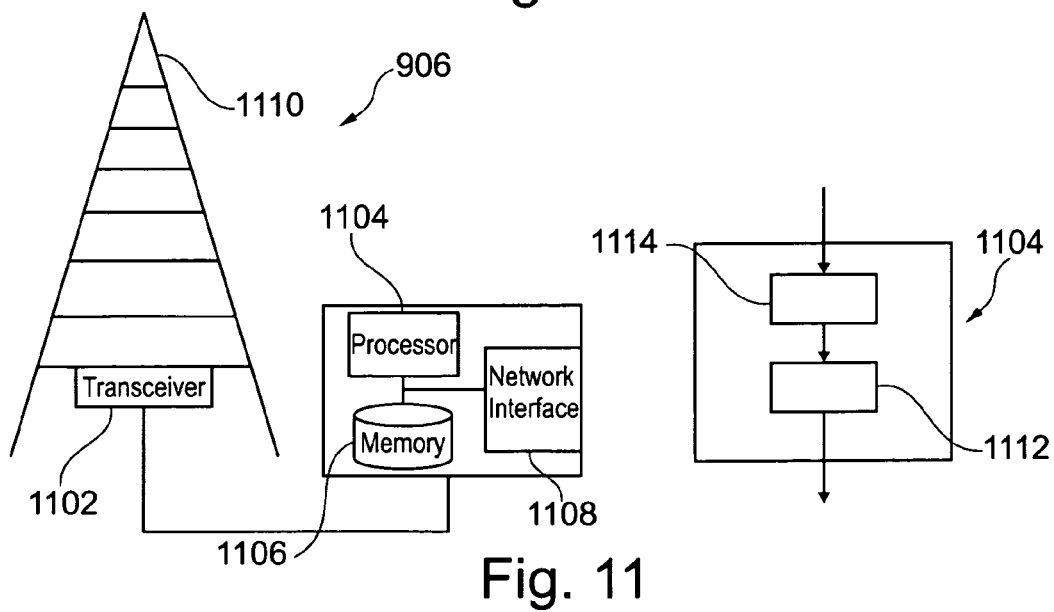
FIG. 11 illustrates a base station according to an exemplary embodiment of the invention.

Similarly, although the illustrated base stations 906 may represent network nodes that include any suitable combination of hardware and/or software, these base stations 906 may, in particular embodiments, represent devices such as the example base station 906 illustrated in greater detail by FIG. 11.

Figure 10:
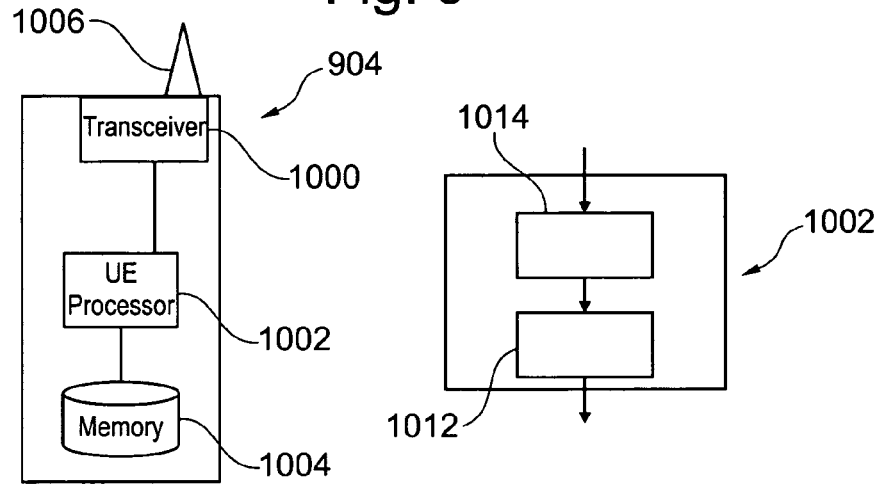
FIG. 10 illustrates a user equipment according to an exemplary embodiment of the invention.

As shown in FIG. 10, the example UE 904 includes a processor 1002, a memory 1004, a transceiver 1000 (having a receiver and a transmitter), and an antenna 1006. In particular embodiments, some or all of the functionality described above as being provided by mobile communication devices or other forms of UE 904 may be provided by the UE processor 1002 executing instructions stored on a computer-readable medium, such as the memory 1004 shown in FIG. 10.

FIG. 10 also shows an exemplary constitution of processor 1002 of the user equipment 904. The processor 1002 comprises a controller 1014 for specifying selected transmission elements among configured transmission elements and for controlling a decoder 1012 so that blind decoding is restricted to the selected transmission elements. For the definition of the transmission elements, reference is made to the examples of FIG. 13 and FIG. 14 described below. Decoder 1012 is provided for performing a blind decoding of transmission elements in a data region within a data transmission in order to detect control data in the data transmission and works under control of the controller 1014. Optionally, other components may be part of the processor 1002 as well.

In general terms, the user equipment 904 is capable of operating within mobile telecommunication system 900. In this mobile telecommunication system 900, control data is to be transmitted from one of the base stations 906 to the user equipment 904. The transceiver 1000 (having a receiver function as well) of the user equipment 904 is adapted to receive the control data in a data transmission (as shown with reference numerals 600, 700, 800, 1300, 1400 in this description). The decoder 1012 is adapted for performing a blind decoding of transmission elements in a data region within the data transmission in order to detect the control data in the data transmission.

Alternative embodiments of the UE 904 may include additional components beyond those shown in FIG. 10 that may be responsible for providing certain aspects of the UE's functionality, including any of the functionality described above and/or any functionality necessary to support the solution described above.

As shown in FIG. 11, the example base station 906 includes a processor 1104, a memory 1106, a transceiver 1102, and an antenna 1110. A network interface 1108 may be foreseen as well. In particular embodiments, some or all of the functionality described above as being provided by a mobile base station, a base station controller, a node B, an enhanced node B, and/or any other type of mobile communications node may be provided by the base station processor 1104 executing instructions stored on a computer-readable medium, such as the memory 1106 shown in FIG. 11.

Also FIG. 11 shows a detailed view of the processor 1104 of the base station 906. A controller 1114 is configured for specifying selected transmission elements among configured transmission elements and for indicating the selected transmission elements for the user equipment 904. This is described in more detail and shown in the examples of FIG. 13 and FIG. 14. Furthermore, the control node 906 has an encoder 1112 for encoding transmission elements within the data transmission in order to enable the user equipment 904 to detect the control data in the data region 604 in the data transmission (as shown with reference numerals 600, 700, 800, 1300, 1400 in this description) by a blind decoding of the transmission elements.

Again, further sections or control portions within the processor 1104 are possible as well.

Alternative embodiments of the base station 906 may include additional components responsible for providing additional functionality, including any of the functionality identified above and/or any functionality necessary to support the solution described above.

More particularly, a computer-readable medium (for instance a CD, a DVD, a USB stick, a harddisk or any other memory) is provided, in which a computer program is stored which, when being executed by a processor (such as a microprocessor or a CPU), is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

Figure 12:
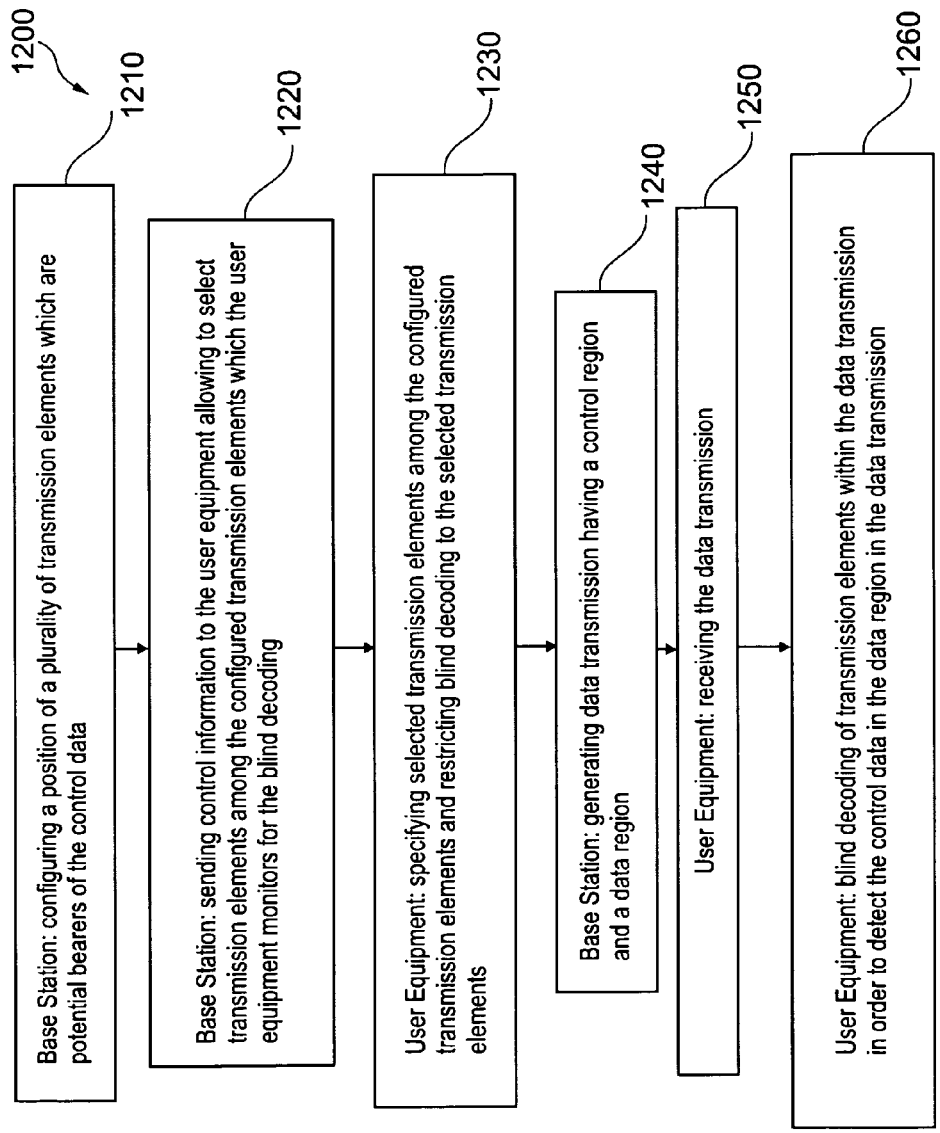
FIG. 12 illustrates a flowchart of a method of operating a mobile telecommunication system according to an exemplary embodiment of the invention.

FIG. 12 shows a flowchart diagram indicating procedures according to a method 1200 for transmission of control data from a base station 906 to a user equipment 904 of a mobile telecommunication system 900 according to an exemplary embodiment of the invention.

The base station, as shown in block 1210, configures a position of a plurality of transmission elements which are potential bearers of the control data. Thus, the transmission elements of the data transmission are analyzed or configured by the base station 906 in terms of which of them could serve as transmission elements via which control data is to be transmitted to the user equipment 904.

As shown in block 1220, the base station 906 sends control information to the user equipment 904 in order to select transmission elements among the configured transmission elements which the user equipment 904 monitors for the blind decoding. Therefore, it is possible to specify a decision rule indicating to the user equipment 904 which positions within the data transmission (as shown with reference numerals 600, 700, 800, 1300, 1400 in this description) should be searched in the process of blind decoding as promising candidates to find blocks of control data for controlling operation of the user equipment 904.

As shown in block 1230, the user equipment 904 specifies selected transmission elements among the configured transmission elements and restricts blind decoding to the selected transmission elements. Thus, in accordance with a definition made by the base station 906, the user equipment 904 has to perform blind decoding only for specific transmission elements which makes it easier to determine position and content of the control data and reduces the required processing capability.

In block 1240, the base station 906 generates a data transmission (as shown with reference numerals 600, 700, 800, 1300, 1400 in this description) having a control region 602 and the data region 604. Examples for such a data transmission are shown, for instance, in FIG. 6 to FIG. 8.

As shown in a subsequent block 1250, the user equipment 904 receives the data transmission (as shown with reference numerals 600, 700, 800, 1300, 1400 in this description) from the base station 906.

In a subsequent block 1260, the user equipment 904 blindly decodes only the selected transmission elements within the data transmission in order to detect the control data in the data region 604 in the data transmission (as shown with reference numerals 600, 700, 800, 1300, 1400 in this description).

Figure 13:
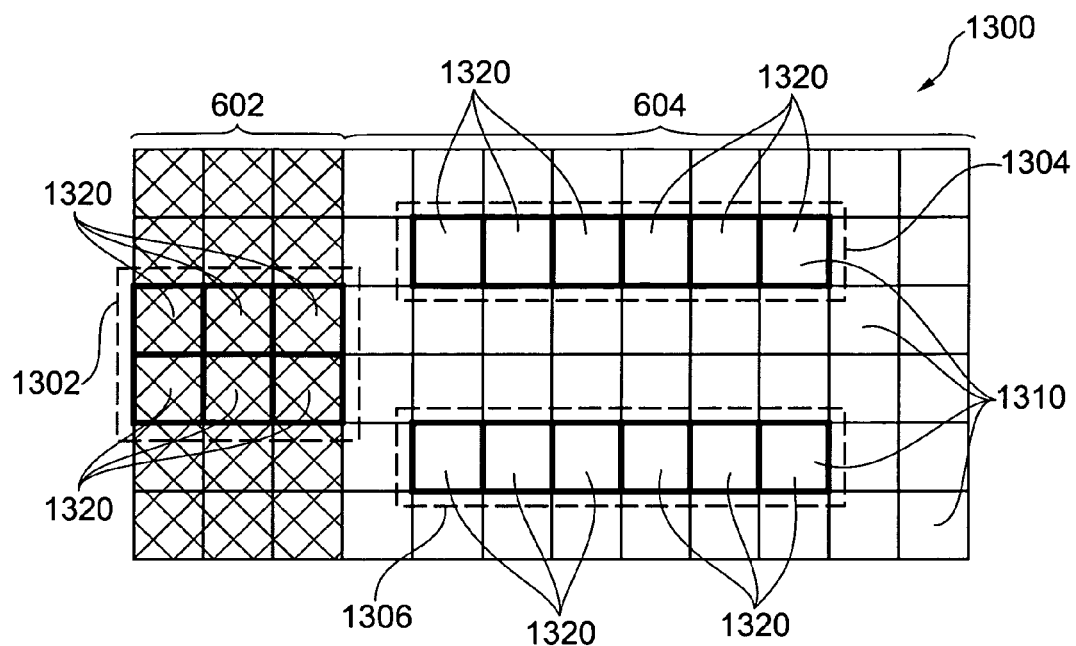
FIG. 13 and FIG. 14 illustrate data transmissions having several control regions according to exemplary embodiments of the invention.

FIG. 13 shows a data transmission 1300 according to an exemplary embodiment of the invention.

Again, the data transmission 1300 has a control region 602 and a data region 604 succeeding the control region 602. The control region 602 consists of control data for controlling communication between the base station 906 and the user equipment 904, whereas the data region 604 is a block in the time frequency domain which includes user data, such as telecommunication content data.

As can be taken from FIG. 13, a plurality of transmission elements 1310 can be seen, each of which being capable of transporting data. However, only some of them, denoted with reference numerals 1320, are defined by the base station 906 as potential bearers of control data used for controlling the user equipment 904. With a corresponding position rule which of the transmission elements 1310 are selected transmission elements 1320 for bearing the control data, it is possible that the user equipment 904 only has to detect these selected transmission elements 1320 to analyze them in terms of the potential bearing of control data. This renders the processing capabilities of the user equipment 904 very moderate.

As can be taken in FIG. 13, a first control data region 1302 is located within the control region 602, whereas a second control data region 1304 is located within the data region 604 as well as a second control data region 1306. Therefore, a user equipment 904 only has to search specifically in one or more of the regions 1302, 1304 and 1306 to determine the control data in the context of a blind decoding procedure.

Figure 14:
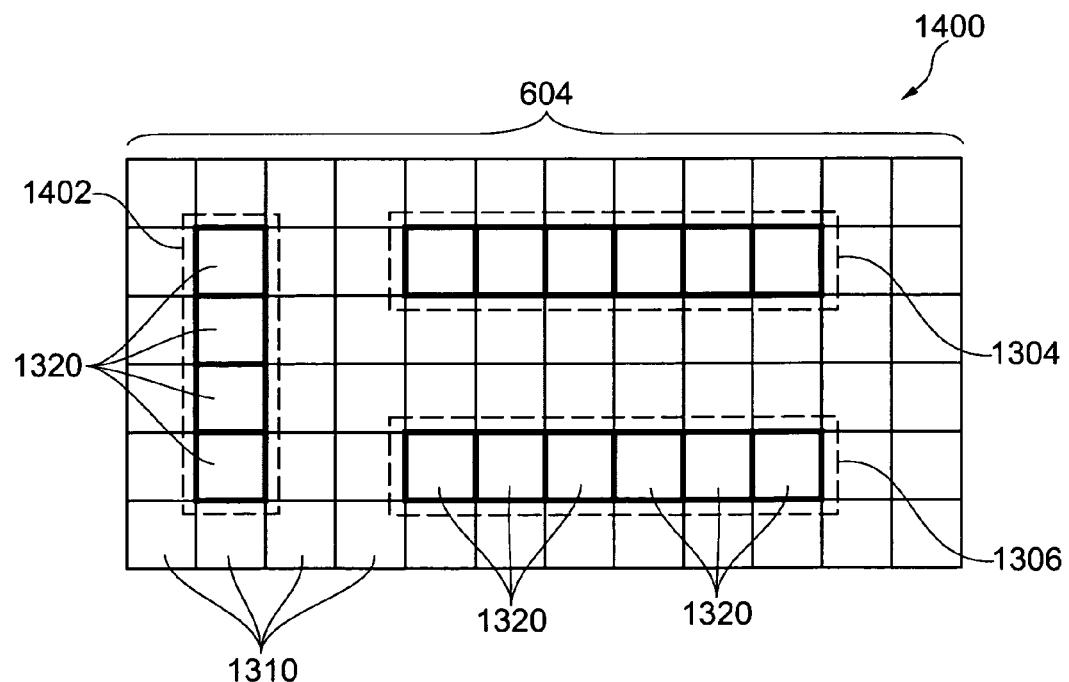

FIG. 14 shows a data transmission 1400 according to another exemplary embodiment of the invention in which three control data regions 1402, 1304, 1306 are shown which are all part of a data region 604. In the embodiment of FIG. 14, the data transmission 1400 is free of a control region 602, i.e. consists of the data region 604 only. Again, only the control data regions 1304, 1306, 1402 need to be searched by user equipment 904 for the presence of control data in the context of a blind decoding procedure.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A method for transmission of control data to a user equipment in a mobile telecommunication system, wherein the method comprises:
   sending control data to the user equipment in a data transmission, wherein the data transmission has a first control data region and a second control data region, wherein the second control data region is located in a data region of the data transmission, wherein the first control data region is located in a control region in the data transmission preceding the data region, wherein the first control data region comprises common control data for different user equipments, and wherein the second control data region comprises user-equipment-specific control data for said user equipment; and
   performing, by the user equipment, a blind decoding of transmission elements within the data transmission in order to detect the control data in the control region and in the data region in the data transmission;
   wherein said user equipment is configured with one or more common search spaces in the first control data region and with one or more user-equipment-specific search spaces in the first control data region, and wherein said performing the blind decoding comprises monitoring the one or more common search spaces in first control data region and at least one search space in the second control data region, but not monitoring the one or more user-equipment-specific search spaces in the first control data region.

2. The method of claim 1, further comprising:
   configuring a position of a plurality of transmission elements that are potential bearers of the control data;
   sending control information to the user equipment in order to select transmission elements among the configured transmission elements;
   monitoring the selected transmission elements, by the user equipment, for the blind decoding.

3. The method of claim 1, wherein the data transmission comprises a control region in the data transmission preceding the data region, wherein the control region is free of control data specifically associated with the user equipment.

4. The method of claim 1, wherein the method further comprises:
   determining whether the user equipment is capable of deriving control data from the data region of the data transmission; and
   upon determining that the user equipment is capable of deriving control data from the data region, sending the user-equipment-specific control data for said user equipment in the data region.

5. The method of claim 1, wherein the data transmission comprises a first section in the time-frequency domain and comprises a distinct second section in the time-frequency domain, wherein the first section comprises a first control region and a first data region, and wherein the second section comprises a second data region, wherein at least one of the first data region and the second data region comprises at least a part of the control data.

6. A user equipment for a mobile telecommunication system, wherein control data is to be transmitted to the user equipment in the mobile telecommunication system, wherein the user equipment comprises:
  a receiver adapted to receive control data in a data transmission, wherein the data transmission has a first control data region and a second control data region, wherein the second control data region is located in a data region of the data transmission, wherein the first control data region is located in a control region in the data transmission preceding the data region, wherein the first control data region comprises common control data for different user equipments, and wherein the second control data region comprises user-equipment-specific control data for said user equipment;
  a decoder for performing a blind decoding of transmission elements in the control region and in the data region within the data transmission in order to detect the control data in the data transmission; and
  a controller adapted to be control the decoder to perform the blind decoding such that performing the blind decoding comprises monitoring one or more common search spaces in first control data region and at least one search space in the second control data region, but not monitoring one or more configured user-equipment-specific search spaces in the first control data region.

7. The user equipment of claim 6,
  wherein a position of a plurality of transmission elements is configured, which transmission elements are potential bearers of the control data, wherein the user equipment is adapted to receive control information in order to select transmission elements among the configured transmission elements which the user equipment monitors for the blind decoding;
  wherein the controller is further adapted to specify selected transmission elements among the configured transmission elements and to control the decoder so that blind decoding is restricted to the selected transmission elements.

8. The user equipment of claim 7, wherein the user equipment is adapted for monitoring control data regions associated with two options of sending Downlink Control Information messages based on the detected control data.

9. The user equipment of claim 6, wherein the user equipment is configured with a control data region of a second type, the second type relating to user-equipment-specific control data regions for said user equipment.

10. The user equipment of claim 9, wherein the control data region of the second type is divided into two sets, wherein a first set is associated with reception of downlink assignments and another set is associated with reception of uplink grants.

11. The user equipment of claim 9, wherein the control information instructs the user equipment to only monitor a subset of sets of control data regions of a specific type.

12. A control node for a mobile telecommunication system, wherein the control node comprises
  a transmitter configured to send control data to a user equipment in a data transmission, wherein the data transmission has a first control data region and has a second control data region, wherein the second control data region is located in a data region of the data transmission, wherein the first control data region is located in a control region in the data transmission preceding the data region, wherein the first control data region comprises common control data for different user equipments, and wherein the second control data region comprises user-equipment-specific control data for said user equipment;
  an encoder configured to encode transmission elements within the data transmission in order to enable the user equipment to detect the control data in the control region and in the data region in the data transmission by a blind decoding of the transmission elements;
  wherein the transmitter is configured to send the data transmission via a multi-carrier transmission, such that the first control data region is carried in a control data region of a first component carrier of the multi-carrier transmission, a corresponding data region of the first component carrier being free of control data, and such that the second control data region is carried in a data region of a second component carrier of the multi-carrier data region.

13. The control node of claim 12,
  wherein a position of a plurality of transmission elements is configured, which transmission elements are potential bearers of the control data, wherein control information is sent to the user equipment in order to select transmission elements among the configured transmission elements which the user equipment monitors for the blind decoding;
  wherein the control node comprises a controller for specifying selected transmission elements among the configured transmission elements and for indicating the selected transmission elements to the user equipment.

14. A mobile telecommunication system for transmission of control data, wherein the mobile telecommunication system comprises
  a user equipment, the user equipment comprising:
    a receiver adapted to receive control data in a data transmission, wherein the data transmission has a first control data region and a second control data region, wherein the second control data region is located in a data region of the data transmission, wherein the first control data region is located in a control region in the data transmission preceding the data region, wherein the first control data region comprises common control data for different user equipments, and wherein the second control data region comprises user-equipment-specific control data for said user equipment; and
    a decoder for performing a blind decoding of transmission elements in the control region and in the data region within the data transmission in order to detect the control data in the data transmission;
    a controller adapted to be control the decoder to perform the blind decoding such that performing the blind decoding comprises monitoring one or more common search spaces in first control data region and at least one search space in the second control data region, but not monitoring one or more configured user-equipment-specific search spaces in the first control data region, and
  a control node, the control node comprising:
    a transmitter for sending control data to a user equipment in the data transmission; and
    an encoder for encoding of transmission elements within the data transmission in order to enable the user equipment to detect the control data in the control region and in the data region in the data transmission by a blind decoding of the transmission elements, wherein the control data is to be transmitted from the control node to the user equipment.

15. A method of operating a user equipment for a mobile telecommunication system, the method comprising:

receiving control data in a data transmission, wherein the data transmission has a first control data region and has a second control data region, wherein the second control data region is located in a data region of the data transmission, wherein the first control data region is located in a control region in the data transmission preceding the data region, wherein the first control data region comprises common control data for different user equipments, and wherein the second control data region comprises user-equipment-specific control data for said user equipment; and performing a blind decoding of transmission elements in the control region and in the data region within the data transmission in order to detect the control data in the data transmission, wherein said user equipment is configured with one or more common search spaces in the first control data region and with one or more user-equipment-specific search spaces in the first control data region, and wherein said performing the blind decoding comprises monitoring the one or more common search spaces in first control data region and at least one search space in the second control data region, but not monitoring the one or more user-equipment-specific search spaces in the first control data region.

16. A method of operating a control node for a mobile telecommunication system, wherein the method comprises:

sending control data to a user equipment in a data transmission, wherein the data transmission has a first control data region and has a second control data region, wherein the second control data region is located in a data region of the data transmission, wherein the first control data region is located in a control region in the data transmission preceding the data region, wherein the first control data region comprises common control data for different user equipments, and wherein the second control data region comprises user equipment specific control data for said user equipment; and encoding transmission elements within the data transmission in order to enable the user equipment to detect the control data in the control region and in the data region in the data transmission by a blind decoding of the transmission elements wherein sending the control data to the user equipment in the data transmission comprises sending the data transmission via a multi-carrier transmission, such that the first control data region is carried in a control data region of a first component carrier of the multi-carrier transmission, a corresponding data region of the first component carrier being free of control data, and such that the second control data region is carried in a data region of a second component carrier of the multi-carrier transmission.

17. A method for transmission of control data to a user equipment in a mobile telecommunication system, wherein the method comprises:

sending control data to the user equipment in a data transmission, wherein the data transmission has a first control data region and a second control data region, wherein the second control data region is located in a data region of the data transmission, wherein the first control data region is located in a control region in the data transmission preceding the data region, wherein the first control data region comprises common control data for different user equipments, and wherein the second control data region comprises user-equipment-specific control data for said user equipment; and performing, by the user equipment, a blind decoding of transmission elements within the data transmission in order to detect the control data in the control region and in the data region in the data transmission;

wherein sending the control data to the user equipment in the data transmission comprises sending the data transmission via a multi-carrier transmission, such that the first control data region is carried in a control data region of a first component carrier of the multi-carrier transmission, a corresponding data region of the first component carrier being free of control data, and such that the second control data region is carried in a data region of a second component carrier of the multi-carrier transmission.

* * * * *

UNITED STATES PATENT AND TRADEMARK OFFICE
CERTIFICATE OF CORRECTION

| | | |
|---|---|---|
| PATENT NO. | : 9,520,975 B2 | Page 1 of 3 |
| APPLICATION NO. | : 14/114991 | |
| DATED | : December 13, 2016 | |
| INVENTOR(S) | : Hoymann et al. | |

It is certified that error appears in the above-identified patent and that said Letters Patent is hereby corrected as shown below:

On the Title Page

In Item (75), under "Inventors", in Column 1, Line 3, delete "Lindborn," and insert -- Lindbom, --, therefor.

In Item (56), under "U.S. PATENT DOCUMENTS", in Column 2, Line 1, delete "Blankenship" and insert -- Blankenship et al. --, therefor.

In Item (56), under "U.S. PATENT DOCUMENTS", in Column 2, Line 3, delete "Liu" and insert -- Liu et al. --, therefor.

Under "Primary Examiner", in Column 2, Line 1, delete "Brandon Renner" and insert -- Hassan Kizou --, therefor.

On Page 2, in Item (56), under "U.S. PATENT DOCUMENTS", in Column 1, Line 1, delete "Nordstrom" and insert -- Nordstrom et al. --, therefor.

On Page 2, in Item (56), under "U.S. PATENT DOCUMENTS", in Column 1, Line 3, delete "Zhuang" and insert -- Zhuang et al. --, therefor.

On Page 2, in Item (56), under "U.S. PATENT DOCUMENTS", in Column 1, Line 8, delete "Malladi" and insert -- Malladi et al. --, therefor.

On Page 2, in Item (56), under "U.S. PATENT DOCUMENTS", in Column 1, Line 10, delete "Chen" and insert -- Chen et al. --, therefor.

On Page 2, in Item (56), under "U.S. PATENT DOCUMENTS", in Column 1, Line 14, delete "Han" and insert -- Han et al. --, therefor.

Signed and Sealed this
Fourth Day of July, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,520,975 B2

On Page 2, in Item (56), under "U.S. PATENT DOCUMENTS", in Column 1, Line 17, delete "Koivisto" and insert -- Koivisto et al. --, therefor.

On Page 2, in Item (56), under "U.S. PATENT DOCUMENTS", in Column 2, Line 1, delete "Sartori" and insert -- Sartori et al. --, therefor.

In the Specification

In Column 4, Line 51, delete "rate" and insert -- rate, --, therefor.

In Column 7, Line 30, delete "networks" and insert -- network --, therefor.

In Column 8, Line 40, delete "embodiment" and insert -- embodiment, --, therefor.

In Column 12, Line 63, delete "description" and insert -- description, --, therefor.

In Column 14, Line 25, delete "CSS" and insert -- (CSS) --, therefor.

In Column 14, Line 38, delete "CSS" and insert -- (CSS) --, therefor.

In Column 14, Line 40, delete "USS" and insert -- (USS) --, therefor.

In Column 14, Line 49, delete "CSS" and insert -- (CSS) --, therefor.

In Column 14, Line 52, delete "USS" and insert -- (USS) --, therefor.

In Column 14, Line 58, delete "USS" and insert -- (USS) --, therefor.

In Column 14, Line 60, delete "CSS" and insert -- (CSS) --, therefor.

In Column 15, Line 16, delete "example" and insert -- example, --, therefor.

In Column 16, Line 48, delete "harddisk" and insert -- hard disk --, therefor.

In the Claims

In Column 19, Line 25, in Claim 6, delete "to be" and insert -- to --, therefor.

In Column 19, Line 62, in Claim 12, delete "comprises" and insert -- comprises: --, therefor.

In Column 20, Line 21, in Claim 12, delete "data region." and insert -- transmission. --, therefor.

In Column 20, Line 36, in Claim 14, delete "comprises" and insert -- comprises: --, therefor.
In Column 20, Line 49, in Claim 14, delete "equipment; and" and insert -- equipment; --, therefor.

CERTIFICATE OF CORRECTION (continued)
U.S. Pat. No. 9,520,975 B2

In Column 20, Line 53, in Claim 14, delete "transmission;" and insert -- transmission; and --, therefor.

In Column 20, Line 54, in Claim 14, delete "to be" and insert -- to --, therefor.

In Column 22, Line 5, in Claim 16, delete "elements" and insert -- elements; --, therefor.